US012693480B1

(12) United States Patent
Zhang

(10) Patent No.: US 12,693,480 B1
(45) Date of Patent: Jul. 28, 2026

(54) PUSH-PULL TYPE MPO CONNECTOR

(71) Applicant: Xiao Zhang, Guangdong (CN)

(72) Inventor: Xiao Zhang, Guangdong (CN)

( * ) Notice: Subject to any disclaimer, the term of this patent is extended or adjusted under 35 U.S.C. 154(b) by 0 days.

(21) Appl. No.: 19/449,265

(22) Filed: Jan. 14, 2026

(30) Foreign Application Priority Data

Jul. 14, 2025 (CN) .......................... 202521483386.6

(51) Int. Cl.
G02B 6/38 (2006.01)
(52) U.S. Cl.
CPC ........... G02B 6/3893 (2013.01); G02B 6/387 (2013.01); G02B 6/3874 (2013.01); G02B 6/38875 (2021.05)
(58) Field of Classification Search
CPC .................................................... G02B 6/3893
See application file for complete search history.

(56) References Cited

U.S. PATENT DOCUMENTS

2024/0142724 A1* 5/2024 Ma ....................... G02B 6/3885
* cited by examiner

*Primary Examiner* — Sung H Pak
(74) *Attorney, Agent, or Firm* — Birchwood IP

(57) ABSTRACT

The present invention relates to a push-pull type multi-fiber push-on (MPO) connector, including a ferrule assembly, an inner housing, an outer housing, a stopper, a pull handle housing, and a tail sleeve. According to the connector, a fitting structure capable of sequentially transmitting a pulling force is disposed between adjacent two of the tail sleeve, the pull handle housing, and the outer housing. Meanwhile, a fitting structure capable of sequentially transmitting a pushing force is disposed between adjacent two of the tail sleeve, the pull handle housing, and the stopper. According to the present invention, the problem of difficult plugging and unplugging of a conventional MPO connector in high-density connection scenarios is effectively solved. During unplugging, there is no need to hold the space-constrained outer housing; and during plugging, there is no need to act directly on the outer housing or the bottom of the stopper.

9 Claims, 6 Drawing Sheets

PUSH-PULL TYPE MPO CONNECTOR

TECHNICAL FIELD

The present invention relates to the field of optical fiber communication connection devices, and specifically, to a push-pull type MPO connector.

BACKGROUND OF THE INVENTION

In the field of optical fiber communications, MPO connectors, as key devices for high-density optical fiber connections, are widely used in data centers, communication equipment rooms, and other scenarios. By integrating the function of rapid docking for multiple optical fibers, the requirements of modern communication systems for high capacity and miniaturized connections are effectively met. With the continuous growth of data transmission volume, the application of MPO connectors in high-density deployment environments has become increasingly common, and the requirements for their operational convenience and spatial adaptability are also constantly increasing.

However, conventional MPO connectors (referring to FIG. 11) have obvious limitations in practical use, especially in high-density connection scenarios, where the operational space between adjacent connectors is extremely narrow and small, making it difficult for the operator's hand to directly hold the housing of the target connector during plugging and unplugging operations. When the connector needs to be unplugged, due to the limited operational space around the target connector, it is difficult for the operator to apply sufficient pulling force. As a result, it is often necessary to remove multiple surrounding connectors to free up operational space, leading to low maintenance efficiency. Similarly, when the connector is plugged, the position of the target connector is blocked, making it impossible to exert pushing force directly. Thus, multiple surrounding connectors must also be removed to create operational space.

The above problems need to be solved.

BRIEF SUMMARY OF THE INVENTION

In order to solve the problem that the housing of the target connector cannot be directly held by hand to apply force during plugging and unplugging of the existing MPO connector in high-density deployment environments due to the narrow and small operational space between adjacent connectors, the present invention provides a push-pull type MPO connector.

The technical solution of the present invention is as follows:

A push-pull type MPO connector, including a ferrule assembly, an MPO inner housing, an MPO outer housing, and an MPO stopper which constitute a connector body, and a pull handle housing and an MPO tail sleeve which constitute a connector sleeve housing, where the pull handle housing is detachably connected to the MPO tail sleeve, and the pull handle housing is slidably connected to the MPO outer housing;

a fitting structure capable of sequentially transmitting a pulling force is disposed between adjacent two of the MPO tail sleeve, the pull handle housing, and the MPO outer housing, such that when the MPO tail sleeve is pulled, the MPO outer housing is driven to move to withdraw the ferrule assembly of the connector from a receptacle; and a fitting structure capable of sequentially transmitting a pushing force is disposed between adjacent two of the MPO tail sleeve, the pull handle housing, and the MPO stopper, such that when the MPO tail sleeve is pushed, the MPO stopper is driven to move to insert the ferrule assembly of the connector into the receptacle.

By adopting the above technical solution, when the ferrule assembly of the connector needs to be withdrawn from the receptacle, an operator can hold the MPO tail sleeve and apply the pulling force in a direction away from the receptacle, the MPO tail sleeve transmits the force to the pull handle housing via the pulling force fitting structure between the MPO tail sleeve and the pull handle housing, and the pull handle housing then drives the MPO outer housing to move synchronously via the pulling force fitting structure between the pull handle housing and the MPO outer housing, thereby withdrawing the ferrule assembly from the receptacle; and when the ferrule assembly needs to be inserted into the receptacle, the operator holds the MPO tail sleeve and applies the pushing force in a direction close to the receptacle, the MPO tail sleeve transmits the force to the pull handle housing via the pushing force fitting structure between the MPO tail sleeve and the pull handle housing, and the pull handle housing then pushes the MPO stopper to move via the pushing force fitting structure between the pull handle housing and the MPO stopper, thereby driving the ferrule assembly to be inserted into the receptacle.

The present invention according to the above solution has the following beneficial effects:

According to the present invention, the problem of difficult plugging and unplugging of a conventional MPO connector in high-density connection scenarios is effectively solved by adding the pull handle housing and the MPO tail sleeve to the MPO connector and utilizing the force transmission fitting structure between the adjacent components.

Specifically, when the connector needs to be unplugged, only the MPO tail sleeve needs to be held, and the pulling force can be sequentially transmitted via the fitting structures between the tail sleeve and the pull handle housing, and between the pull handle housing and the MPO outer housing to drive the MPO outer housing to move, thereby withdrawing the ferrule assembly from the receptacle. There is no need to directly hold the space-constrained MPO outer housing, thereby avoiding the trouble of large-area removal of surrounding structures due to the inability to insert the hand. When the connector needs to be plugged, the pushing force generated by pushing the MPO tail sleeve is sequentially transmitted via the fitting structures between the MPO tail sleeve and the pull handle housing, and between the pull handle housing and the MPO stopper to drive the MPO stopper to move, thereby smoothly inserting the ferrule assembly into the receptacle. The operation process does not require direct action on the bottom of the MPO outer housing or the MPO stopper, such that the connector is also applicable to narrow and small space environments.

Figure 1:
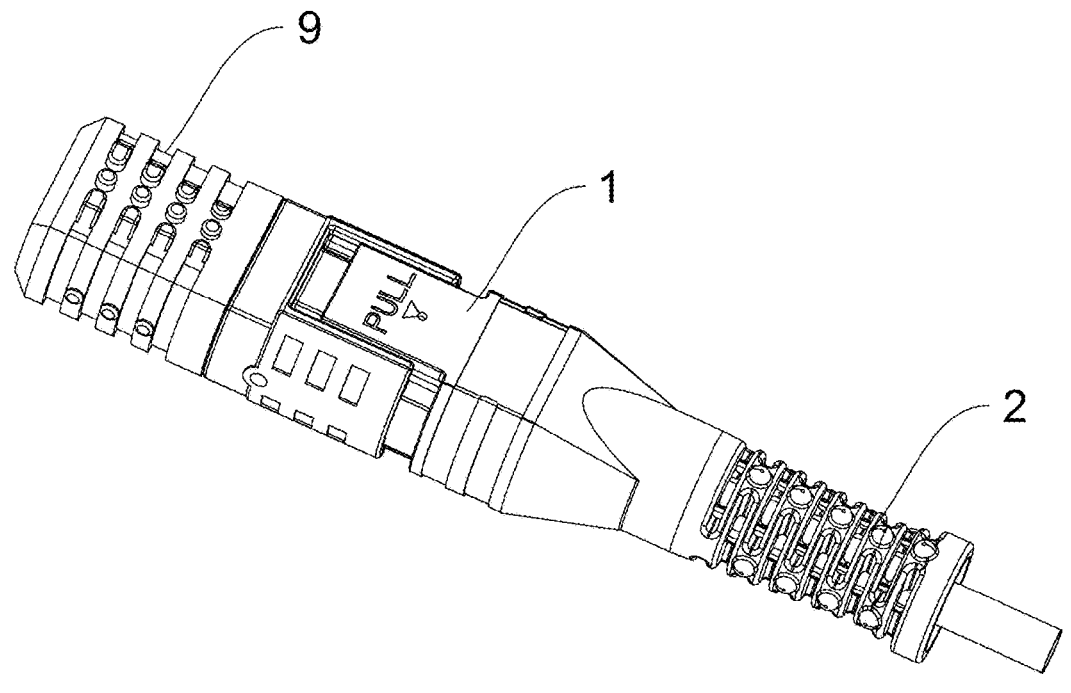
FIG. 1 is a schematic structural diagram of the present invention.

1, pull handle housing; 11, sliding rail; 12, pull handle housing fastener recess; 13, pull handle housing fastener boss; 14, fastener release hole; 15, pull handle housing outer fitting surface; 16, pull handle housing force application surface; 17, reinforcing post;

2, MPO tail sleeve; 21, tail sleeve fastener boss; 22, forward thrust surface; 23, plug hole; 24, boss dot; 25, bending reinforcement rib; 26, dual-ring platform;

3, MPO inner housing; 31, spring groove; 32, inner housing fastener; 33, side fastener hole;

4, MPO outer housing; 41, sliding groove; 42, outer housing fastener boss; 43, outer housing fastener;

5, MPO stopper; 51, forward force-bearing surface; 52, side fastener;

6, ferrule assembly;

7, MPO female socket;

8, central spring;

9, dust cap;

10, metal pressure ring; 11, metal clamping ring; and 12, optical cable.

DETAILED DESCRIPTION OF THE INVENTION

To better understand the objectives, technical solutions, and technical effects of the present invention, the present invention is further described below with reference to the accompanying drawings and embodiments. It should be noted that similar reference numerals and letters represent similar items in the following accompanying drawings. Therefore, once an item is defined in an accompanying drawing, it is not required to be further defined and explained in the subsequent accompanying drawings. It is hereby declared that the embodiments described below are only used to explain the present invention and are not intended to limit the present invention.

It is to be noted that when one element is referred to as being "fixed to" or "disposed on" another element, it may be directly located on another element or there may also be a centered element. When one element is regarded to be "connected to" another element, it may be directly connected to another element or there may also be a centered element.

The indicated orientations or positional relationships are based on orientations or positional relationships shown in the accompanying drawings, customary orientations or positional relationships when the product in this application is in use, or orientations or positional relationships customarily understood by those skilled in the art, only for the convenience of describing the present application and simplifying the description rather than indicating or implying that the apparatus or element referred to must have a particular orientation or be constructed and operated in a particular orientation, and therefore cannot be construed as limitations to the present application.

The terms "first" and "second" are only for easy description, and cannot be construed as indicating or implying relative importance or implying the number of technical features. The terms "a plurality of" and "several" mean two or more, unless otherwise expressly and specifically defined.

As shown in FIG. 1, FIG. 2, FIG. 9, and FIG. 10, a push-pull type MPO connector includes:

a connector body, including a ferrule assembly 6, an MPO inner housing 3, an MPO outer housing 4, and an MPO stopper 5; and a connector sleeve housing, including a pull handle housing 1 and an MPO tail sleeve 2, where the pull handle housing 1 and the MPO tail sleeve 2 are detachably connected.

Compared with a conventional MPO connector, the present invention has the advantages that the connector sleeve housing is added, and the MPO outer housing 4 is connected to the pull handle housing 1, such that the connector sleeve housing is sleeved at the bottom of the connector body.

In the present invention, a fitting structure capable of sequentially transmitting a pulling force is disposed between adjacent two of the MPO tail sleeve 2, the pull handle housing 1, and the MPO outer housing, such that when the MPO tail sleeve 2 is pulled, the MPO outer housing is driven to move to withdraw the ferrule assembly 6 of the connector from a receptacle; and a fitting structure capable of sequentially transmitting a pushing force is disposed between adjacent two of the MPO tail sleeve 2, the pull handle housing 1, and the MPO stopper 5, such that when the MPO tail sleeve 2 is pushed, the MPO stopper 5 is driven to move to insert the ferrule assembly 6 of the connector into the receptacle.

According to the present invention, an efficient force transmission path is constructed by adding the connector sleeve housing, thereby solving the problem of operational limitations of the conventional MPO connector in high-density scenarios. In terms of pulling force transmission, the MPO tail sleeve 2 and the pull handle housing 1 form a first-stage pulling force fit via a fastener structure (such as a tail sleeve fastener boss 21 and a fastener recess of the pull handle housing 1), and the pull handle housing 1 and the MPO outer housing form a second-stage pulling force fit via a fastener structure (such as an outer housing fastener boss 42 and a pull handle housing fastener boss 13). When the MPO tail sleeve 2 is pulled, the pulling force is sequentially transmitted from the tail sleeve to the pull handle housing 1, and then from the pull handle housing 1 to the MPO outer housing, and finally the MPO outer housing pulls the MPO connector out of the receptacle, thereby achieving unplugging.

In terms of pushing force transmission, a forward thrust surface 22 of the MPO tail sleeve 2 and an outer fitting surface of the pull handle housing 1 form a first-stage pushing force fit, and a force application surface of the pull handle housing 1 and a rear end surface of the MPO stopper 5 form a second-stage pushing force fit. When the MPO tail sleeve 2 is pushed, the pushing force is transmitted from the tail sleeve to the pull handle housing 1, then the pull handle housing 1 acts directly on the MPO stopper 5, and finally the MPO stopper 5 pushes the MPO connector to move forward to complete docking with the receptacle.

It can be seen that, on the one hand, the connector sleeve housing shifts an operation point to the easily held MPO tail sleeve 2, such that plugging and unplugging can be completed by holding only the tail sleeve without directly contacting the space-constrained MPO outer housing or stopper, thereby completely avoiding the trouble of removal of surrounding connectors in high-density scenarios, and greatly improving operational efficiency; and on the other hand, the staged transmission structure of the pulling force and the pushing force ensures the stability and accuracy of force transmission and reduces the risk of damage to the connector and optical fibers during operation, and the detachable connection design of the pull handle housing 1 and the MPO tail sleeve 2 also facilitates later maintenance and component replacement, thereby taking practicality and reliability into account.

Figure 4:
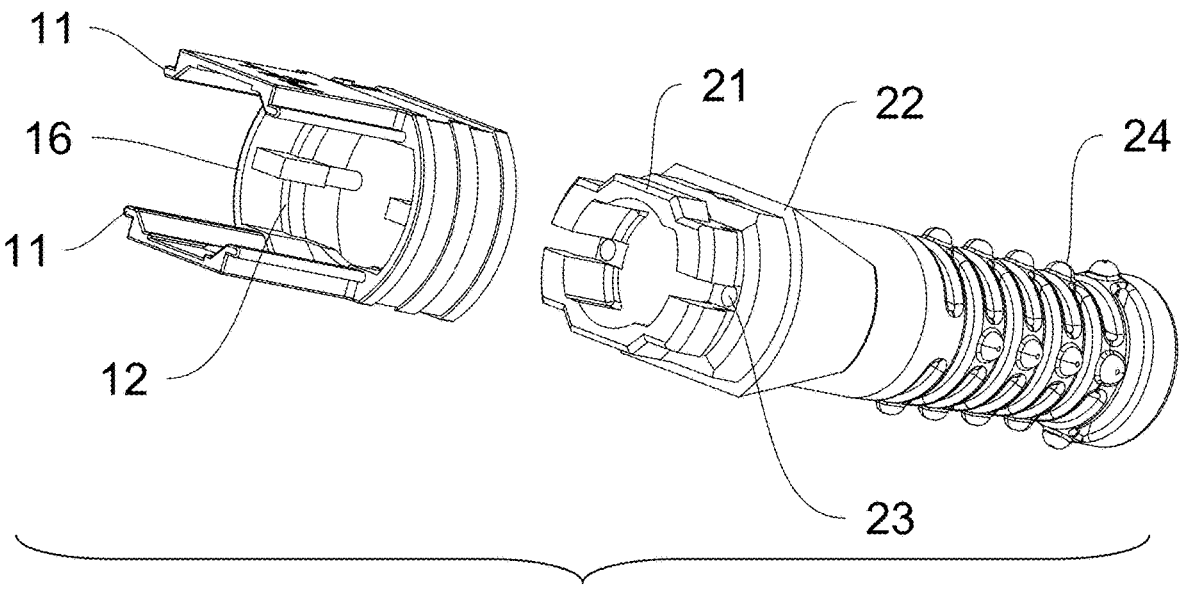
FIG. 4 is an exploded view of a structure of a connector sleeve housing in the present invention.
Figure 5:
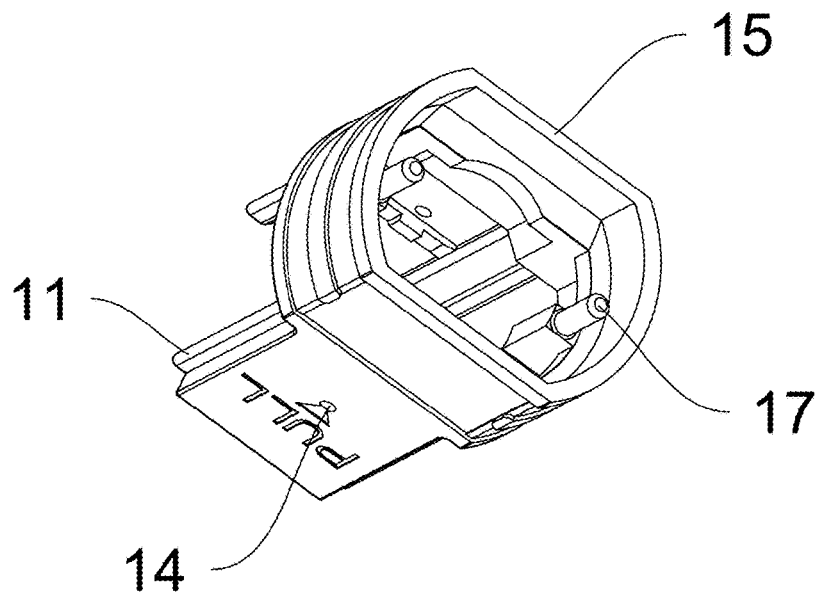
FIG. 5 is a schematic structural diagram of a pull handle housing.
Figure 7:
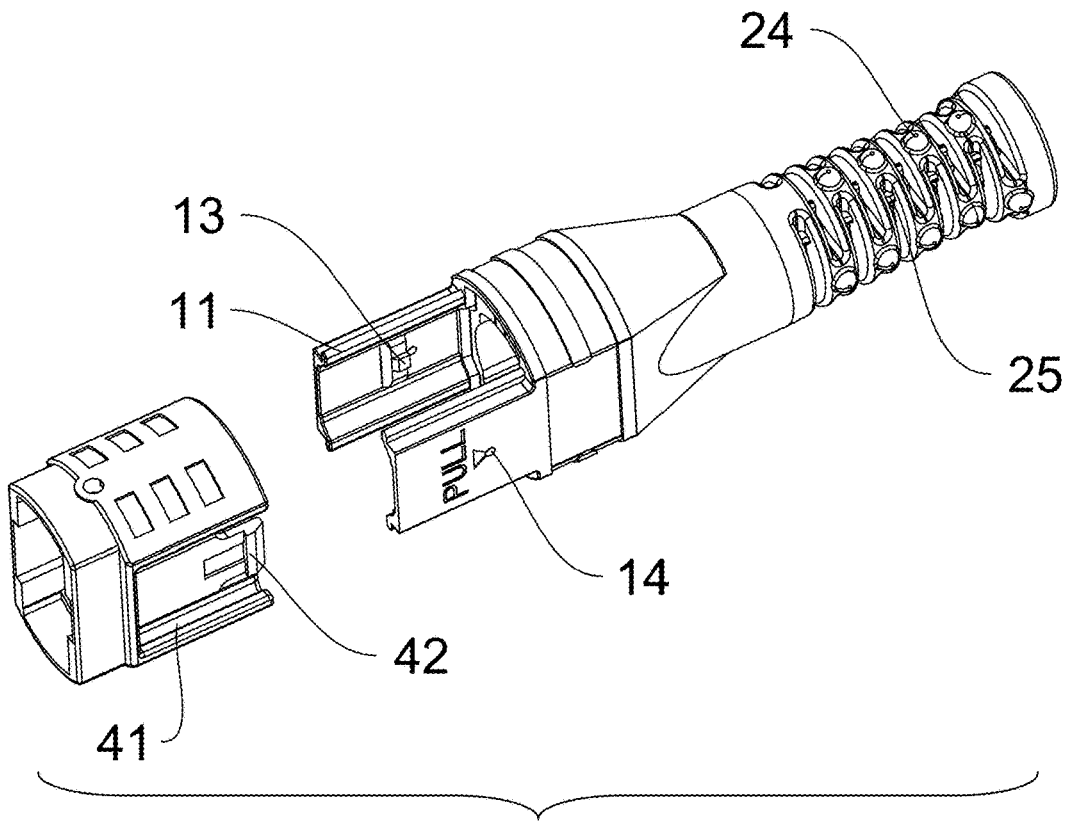
FIG. 7 is a schematic assembly diagram of a connector sleeve housing and an MPO outer housing.

As shown in FIG. 4, FIG. 5, and FIG. 7, in this embodiment, two opposite sidewalls of the MPO outer housing are each provided with axially extending sliding grooves 41, the pull handle housing 1 is correspondingly provided with sliding rails 11, and the pull handle housing 1 is snap-fitted into the MPO outer housing after the sliding grooves 41 are slidably connected to the sliding rails 11 and slide into place. Specifically, an edge of each of two opposite sidewalls of the MPO outer housing (sidewalls provided with a fitting structure for transmitting a pulling force with the pull handle housing 1) is provided with symmetrical sliding grooves 41, and cross sections of the sliding grooves 41 are C-shaped. Corresponding sidewalls of the pull handle housing 1 are provided with sliding rails 11. The sliding rails 11 are formed by folding and extending side edges of the sidewalls downward and outward, such that cross sections of the sidewalls of the pull handle housing 1 provided with the tracks are "n"-shaped. The fit between the C-shaped sliding grooves 41 and the "n"-shaped sliding rails 11 not only provides precise axial sliding guidance, but also forms transverse limiting via structural nesting, thereby effectively preventing the pull handle housing 1 from shifting or wobbling during sliding, and ensuring the stability of the force transmission path. Moreover, the sliding rails 11 of the pull handle housing 1 have an "n"-shaped structure formed by folding and extending the sidewalls, which significantly improves the antideformation capability of the tracks compared with conventional flat tracks.

When the pull handle housing 1 and the MPO outer housing are assembled, an operator aligns the protruding sliding rails 11 on the pull handle housing 1 with the C-shaped sliding grooves 41 of the MPO outer housing 4 and axially pushes the pull handle housing into the MPO outer housing. When the pull handle housing 1 slides to a predetermined position, the outer housing fastener boss 42 is snap-fitted into the pull handle housing fastener boss 13 via elastic deformation, thereby locking the pull handle housing 1 and the MPO outer housing to each other.

The two sidewalls of the pull handle housing 1 provided with the tracks extend axially, facilitating a sliding connection with the outer sidewalls of the MPO outer housing 4. A surface of each of the sidewalls of the pull handle housing 1 provided with the tracks is marked with a word "PULL" and a triangular indicating arrow to indicate a pulling direction. A blank surface on a same side of each of the sidewalls of the pull handle housing 1 provided with the tracks can be used to provide a company LOGO.

As shown in FIGS. 4, 6, 7, and 9, in this embodiment, in the fitting structure capable of sequentially transmitting the pulling force between adjacent two of the MPO tail sleeve 2, the pull handle housing 1, and the MPO outer housing, an outer sidewall of an end part of the MPO tail sleeve 2 is provided with a tail sleeve fastener boss 21, and the pull handle housing 1 is correspondingly provided with a pull handle housing fastener recess 12 that fits with the tail sleeve fastener boss 21. Specifically, an outer sidewall of a port of the MPO tail sleeve 2 protrudes radially outward to form the tail sleeve fastener boss 21. Two short sides of the port of the MPO tail sleeve 2 are each provided with a notch groove, such that the tail sleeve fastener boss 21 at the port of the MPO tail sleeve 2 has contraction elasticity. In the process of inserting the MPO tail sleeve 2 into an opening in the bottom of the pull handle housing 1, the tail sleeve fastener boss 21 contracts to pass through the pull handle housing fastener recess 12, restores to its original state after being in place, and forms a snap fit with an inner sidewall of the pull handle housing fastener recess 12, thereby achieving axial limiting between the MPO tail sleeve 2 and the pull handle housing 1. An inner sidewall of the pull handle housing 1 protrudes radially inward to form the pull handle housing fastener recess 12, which can abut against an end surface of the tail sleeve fastener boss 21, thus forming a rigid fit surface during pulling force transmission.

An outer sidewall of the MPO outer housing is provided with an outer housing fastener boss 42, and the outer housing fastener boss 42 is located between the two sliding grooves 41 on a same side. The pull handle housing 1 is correspondingly provided with a pull handle housing fastener boss 13 that fits with the outer housing fastener boss 42. Specifically, an elastic plate is disposed in the middle of each of the two sidewalls of the MPO housing provided with the sliding grooves 41, an outer side surface of the elastic plate is provided with an outwardly protruding outer housing fastener boss 42, and an "inverted-T"-shaped pull handle housing fastener boss 13 is disposed in the middle of an inner wall surface of each of the sidewalls of the pull handle housing 1 provided with the tracks. The elastic plate has a certain elasticity. The opposing surfaces of the outer housing fastener boss 42 and the pull handle housing fastener boss 13 are provided with inclined guide slopes. During sliding of the pull handle housing 1 and the MPO outer housing, the guide slopes of the outer housing fastener boss 42 and the pull handle housing fastener boss 13 come into contact and press against each other, and the elastic plate can drive the outer housing fastener boss 42 to elastically deform inward to bypass obstruction of the pull handle housing fastener boss 13. When sliding to a snap-fit position, the elastic plate recovers its deformation, and a rear end surface of the outer housing fastener boss 42 abuts against a front end surface of the pull handle housing fastener boss 13, thus forming an axially limiting fastener structure.

A fastener clamping groove is further formed in the side of the outer housing fastener boss 42 and in the outer side surface of the elastic plate. When the pull handle housing 1 and the MPO outer housing slide into place, the pull handle housing fastener boss 13 of the pull handle housing 1 is correspondingly embedded into the fastener clamping groove, thereby enhancing the overall stability of a snap-fitting structure. In this case, the pull handle housing fastener boss 13 and the outer housing fastener boss 42 form a bidirectional limiting fit, namely the rear end surface of the outer housing fastener boss 42 abuts against the front end surface of the pull handle housing fastener boss 13, thereby restricting the two from axially moving away from each other; and an inner sidewall of the fastener clamping groove fits against a side surface of the pull handle housing fastener boss 13, thereby restricting their relative radial wobbling.

When the MPO tail sleeve is pulled, a fit surface between the tail sleeve fastener boss 21 and the pull handle housing fastener recess 12, and a fit surface between the pull handle housing fastener boss 13 and the outer housing fastener boss 42 transmit the pulling force to drive the MPO outer housing to move. Specifically, the transmission of the pulling force is achieved sequentially via two stages of rigid fit surfaces. The specific process is as follows:

First, when the MPO tail sleeve 2 is pulled, the tail sleeve fastener boss 21 at the end part thereof forms an axially limiting snap fit with the pull handle housing fastener recess 12 of the pull handle housing 1, such that the end surface of the tail sleeve fastener boss 21 abuts tightly against the inner sidewall of the pull handle housing fastener recess 12 (i.e., a fit surface between the two). In this case, the pulling force is directly transmitted from the MPO tail sleeve 2 to the pull handle housing 1 via the fit surface, such that the pull handle housing 1 is subjected to force synchronously with the tail sleeve. Next, since the pull handle housing 1 has been snap-fitted into the MPO outer housing, when the pull handle housing 1 is subjected to force, the front end surface of the pull handle housing fastener boss 13 exerts a rearward pulling force on the rear end surface of the outer housing fastener boss 42 of the MPO outer housing (i.e., a fit surface between the two), and this acting force is transmitted to the MPO outer housing via rigid contact. Throughout the entire process, the two stages of fit surfaces (between the tail sleeve and the pull handle housing 1, and between the pull handle housing 1 and the MPO outer housing) are both in rigid abutment, ensuring that the pulling force is transmitted sequentially without loss. Meanwhile, the fit between the sliding grooves 41 and the sliding rails 11 restricts radial offset of the components, such that the pulling force always acts axially and ultimately drives stable movement of the MPO outer housing, thereby withdrawing the ferrule assembly 6 of the connector. It can be seen that the staged transmission structure in this solution not only ensures effective force transmission, but also prevents looseness or disengagement during transmission via the bidirectional limiting design, thereby ensuring operational stability.

As shown in FIG. 7, in a preferred embodiment, a position of a sidewall of the pull handle housing 1 corresponding to the outer housing fastener boss 42 is provided with a fastener release hole 14 penetrating through the sidewall of the pull handle housing 1. During jumper wire fabrication or connector rework, when the pull handle housing 1 needs to be disassembled from the MPO outer housing, the operator inserts a slender tool (such as tweezers or a dedicated fastener release pin) into the fastener release hole 14, with a front end of the tool directly acting on an outer side surface of the outer housing fastener boss 42. Since the outer housing fastener boss 42 is located on the elastic plate, the pressure applied by the tool forces the elastic plate to bend and deform inward, thereby driving the outer housing fastener boss 42 to contract toward a central axis of the MPO outer housing. When the rear end surface of the outer housing fastener boss 42 disengages from the front end surface of the pull handle housing fastener boss 13, the axial limiting between the two is released, and the pull handle housing fastener boss 13 is disengaged from the fastener clamping groove. In this case, the operator can push the pull handle housing 1 in the direction of the sliding grooves 41 to be separated from the MPO outer housing, thus completing the disassembly process.

As shown in FIGS. 3, 4, 5, and 10, in this embodiment, in the fitting structure capable of sequentially transmitting the pushing force between adjacent two of the MPO tail sleeve 2, the pull handle housing 1, and the MPO stopper 5, a front end of the MPO tail sleeve 2 is provided with a forward thrust surface 22 extending radially inward, and a rear end surface of the pull handle housing 1 is provided with a pull handle housing outer fitting surface 15 corresponding to the forward thrust surface 22. Specifically, the forward thrust surface 22 is a stepped surface encircling the MPO tail sleeve 2, and the pull handle housing outer fitting surface 15 is an annular surface of the opening in the bottom of the pull handle housing 1. Both the forward thrust surface 22 and the pull handle housing outer fitting surface 15 are flat surfaces. When the forward thrust surface abuts against the pull handle housing outer fitting surface to form a full-area fit, it is ensured that the pushing force is uniformly transmitted axially, and structural deformation caused by local stress concentration is avoided.

A rear end of the MPO stopper 5 is provided with a forward force-bearing surface 51 extending radially inward, and a front end surface of the pull handle housing 1 is provided with a pull handle housing force application surface 16 corresponding to the forward force-bearing surface 51. Specifically, the forward force-bearing surface 51 is an annular surface of an opening in the bottom of the MPO stopper 5, and the pull handle housing force application surface 16 is a top surface of an opening between the two sidewalls of the pull handle housing 1 provided with the rails. Both the top surface of the opening and the annular surface (the forward force-bearing surface 51) of the opening in the bottom of the MPO stopper 5 are flat and mutually parallel planes. When the MPO stopper abuts against the pull handle housing, the pushing force can be stably transmitted via surface contact, thereby preventing tilting or jamming of the stopper due to offset of a force-bearing point.

When the MPO tail sleeve is pushed, the full-area fit between the forward thrust surface 22 and the pull handle housing outer fitting surface 15 enables the pushing force to be uniformly transmitted from the tail sleeve to the pull handle housing 1, thereby avoiding component damage caused by excessive local stress. Meanwhile, the parallel surface contact between the pull handle housing force application surface 16 and the forward force-bearing surface 51 ensures that the pushing force acts precisely axially on the MPO stopper 5, such that the stopper and the ferrule assembly 6 are driven to move forward stably, thereby ensuring precise docking of the ferrule assembly 6 with the receptacle. Especially in high-density connection scenarios, this surface-contact force transmission method can effectively reduce a docking deviation caused by limited operating space, thereby improving the reliability and efficiency of insertion.

Figure 3:
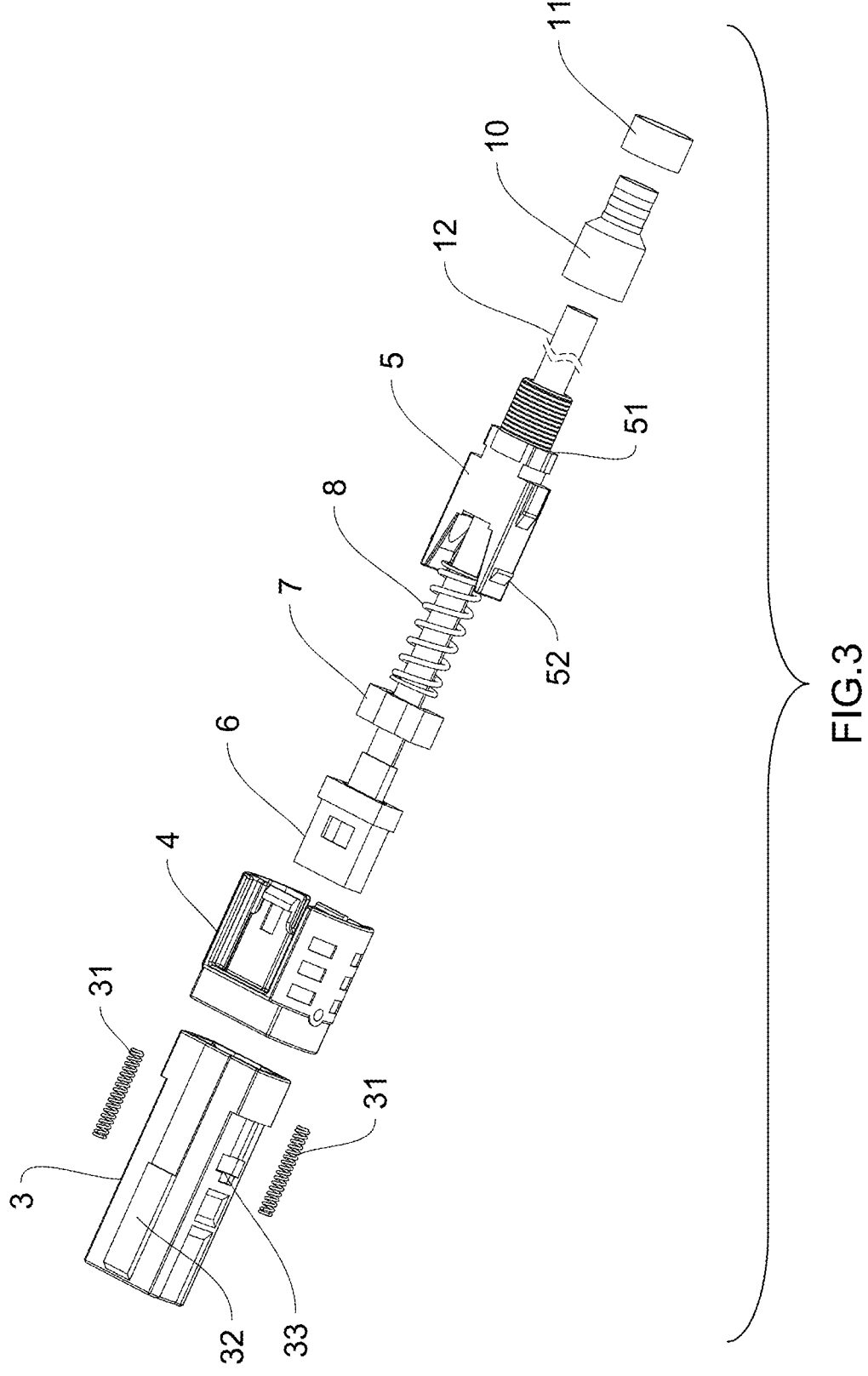
FIG. 3 is an exploded view of a structure of a connector body in the present invention.
Figure 8:
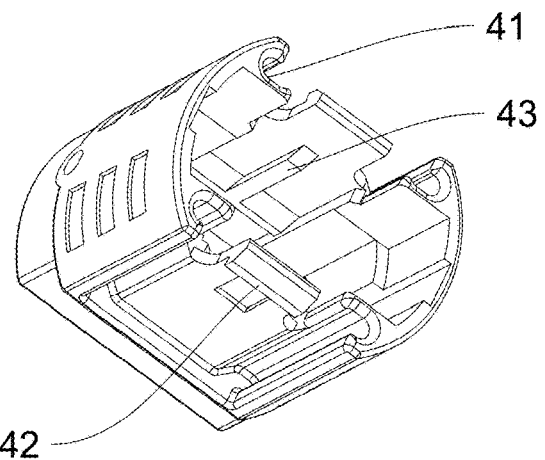
FIG. 8 is a schematic structural diagram of an MPO outer housing.
Figure 9:
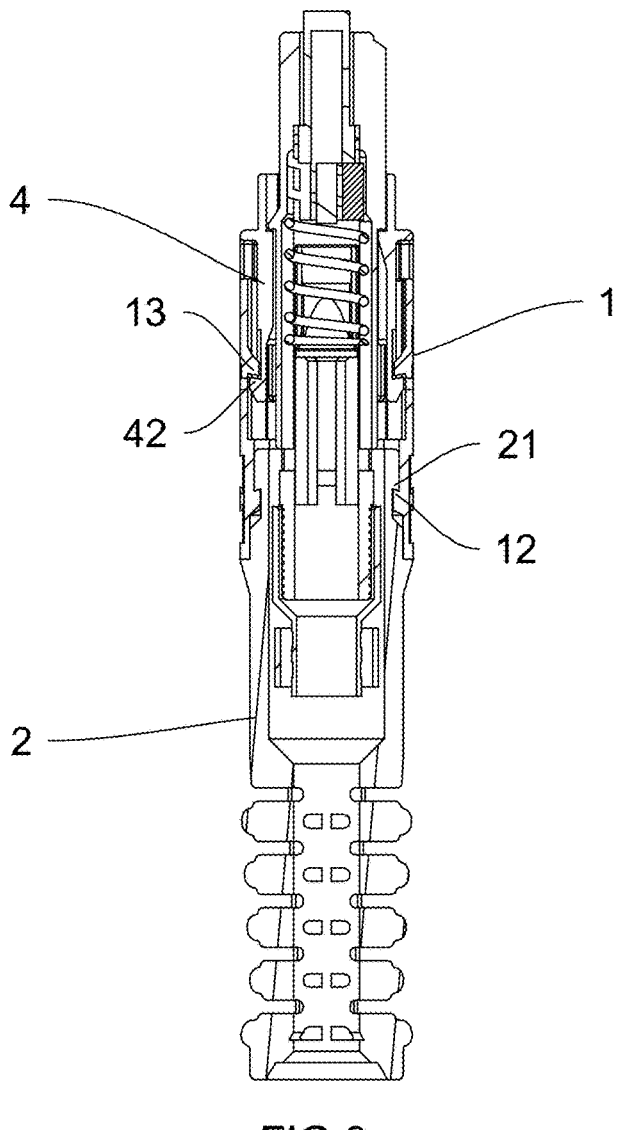
FIG. 9 is a schematic diagram of a longitudinal section of one narrow side of an MPO connector in the present invention.
Figure 10:
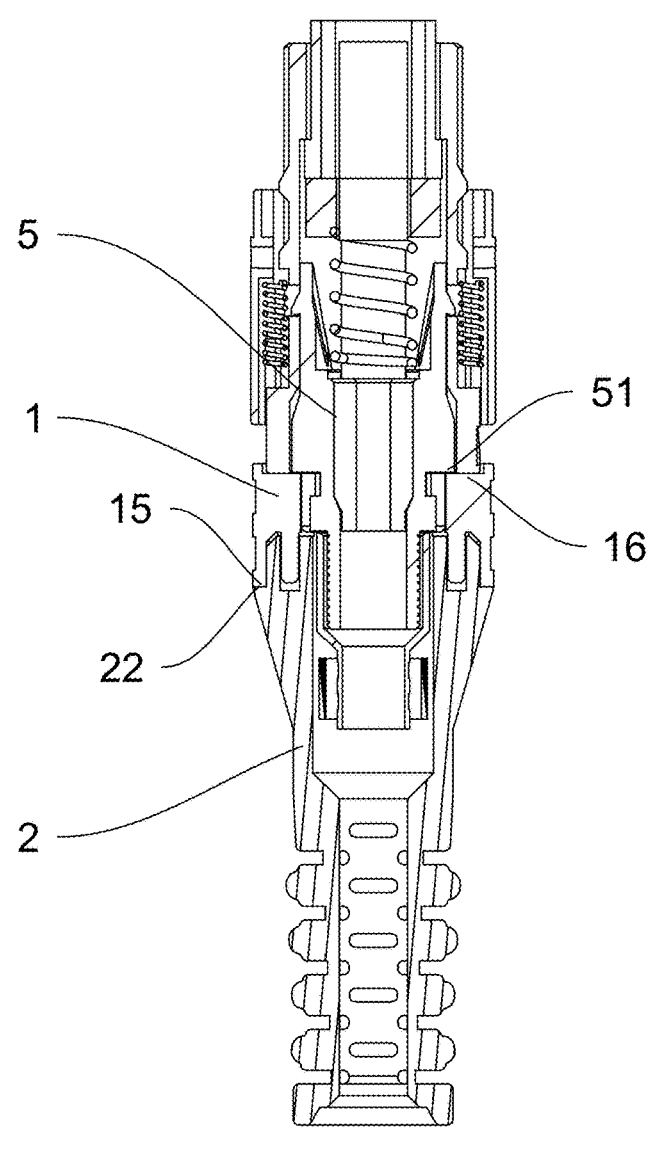
FIG. 10 is a schematic diagram of a longitudinal section of one wide side of an MPO connector in the present invention.
Figure 11:
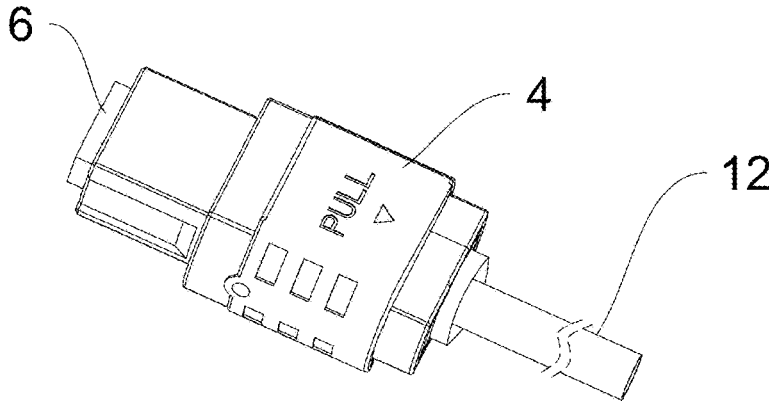
FIG. 11 is a schematic structural diagram of an existing MPO connector.

As shown in FIGS. 3, 7, and 8, in this embodiment, two opposite outer sidewalls of the MPO inner housing 3 are provided with spring grooves 31, and side springs are mounted in the spring grooves 31. Other two opposite outer sidewalls of the MPO inner housing 3 are provided with inner housing fasteners 32, inner sidewalls of the MPO outer housing 4 are correspondingly provided with outer housing fasteners 43, and the MPO outer housing 4 is sleeved outside the bottom of the MPO inner housing 3 and is snap-fitted into the MPO inner housing 3 via the inner housing fasteners 32 and the outer housing fasteners 43. Specifically, left and right outer sidewalls of the MPO inner housing 3 are provided with spring grooves 31, and front and rear outer sidewalls of the MPO inner housing are provided with inner housing fasteners 32. Correspondingly, front and rear inner sidewalls of the MPO outer housing 4 are provided with outer housing fasteners 43. The inner housing fastener 32 is a protruding structure on an outer sidewall surface of the MPO inner housing 3, and the outer housing fastener 43 is a protruding structure on an inner sidewall surface of the MPO outer housing 4. In an optional embodiment, the inner housing fastener 32 is a strip-shaped bump, a front end surface of the strip-shaped bump is provided with a guide surface, and a rear end surface of the strip-shaped bump is a vertical surface; and the outer housing fastener 43 is a T-shaped bump, a rear end surface of the T-shaped bump is provided with a guide surface and a front end surface of the T-shaped bump is a vertical surface. When the MPO inner housing is inserted into the bottom of the MPO outer housing and pushed axially, the front end guide surface of the inner housing fastener 32 (the strip-shaped bump) contacts and slides against the rear end guide surface of the outer housing fastener 43 (the T-shaped bump), and an inclination angle of the guide surfaces guides the two to smoothly bypass each other, until the MPO inner housing is pushed to the snap-fit position. In this case, the vertical rear end surface of the strip-shaped bump abuts against the vertical front end surface of the T-shaped bump to form an axially limiting rigid fit.

The side spring mounted in the spring groove 31 of the MPO inner housing 3 is half inside the groove and half exposed outside the groove to elastically abut against an inner wall of the MPO outer housing, such that the side spring is in a slightly compressed state. An elastic force of the side spring forces the vertical front end surface of the outer housing fastener 43 and the vertical rear end surface of the inner housing fastener 32 to fit tightly together, thereby further increasing an abutment force between the two, and effectively preventing looseness of the snap-fitting structure during long-term use or in vibration environments.

As shown in FIG. 3, in the present invention, the ferrule assembly 6 is inserted into the top of the MPO inner housing 3 and protrudes from the MPO outer housing 4 such that the ferrule assembly 6 can be connected to the receptacle. The MPO stopper is inserted into the bottom of the MPO inner housing 3. Two opposite outer sidewalls of the MPO stopper are provided with side fasteners 52, the MPO inner housing 3 is correspondingly provided with side fastener holes 33, and the side fasteners 52 are snap-fitted into the side fastener holes 33. Specifically, the side fasteners 52 are protruding trapezoidal blocks on left and right sidewall surfaces of the MPO stopper, with inclined guide surfaces facing the MPO inner housing 3. The side fastener holes 33 are openings in left and right sidewalls of the MPO inner housing 3, which are adapted to the protruding trapezoidal blocks. When the MPO stopper 5 is inserted into place from the bottom of the MPO inner housing 3, the trapezoidal blocks are embedded into the side fastener holes 33 to form axial limiting, thereby ensuring a stable connection between the MPO stopper 5 and the MPO inner housing.

A top portion of the MPO inner housing 3 protruding from the MPO outer housing 4 is further provided with a dust cap 9. The dust cap 9 is snap-fitted into the top of the MPO inner housing 3 and covers the entire ferrule assembly 6 to provide dust protection for the ferrule assembly 6.

In addition, a tail end of the ferrule assembly 6 is sleeved with an MPO female socket 7, a central spring 8 is disposed between the MPO female socket 7 and the MPO stopper, one end of the central spring 8 abuts against the MPO female socket 7, and the other end of the central spring abuts against the MPO stopper. After the MPO stopper 5 is inserted into the bottom of the MPO inner housing, the MPO stopper 5 is close to the ferrule assembly 6, thereby compressing the central spring 8.

As shown in FIGS. 4 and 5, in a preferred embodiment, two opposite sides of the bottom of the pull handle housing 1 are provided with reinforcing posts 17; corresponding sides of a port of the MPO tail sleeve are provided with notch grooves, the notch grooves are configured to avoid the reinforcing posts 17 and to enhance the elasticity of the port of the MPO tail sleeve, and groove bottoms of the notch grooves are provided with plug holes 23; and when the pull handle housing 1 is connected to the MPO tail sleeve, the reinforcing posts 17 are inserted into the plug holes 23. Specifically, the reinforcing posts 17 extend vertically downward along sidewalls of the bottom of the pull handle housing 1, and their cross sections are matched with the shape of the plug holes 23 (such as a circular shape or a square shape), thereby ensuring a tight fit after insertion. The notch grooves provide mounting spaces for the reinforcing posts 17, thereby avoiding structural interference during assembly. The local hollow-out design of the sidewalls of the port enhances the contraction elasticity of the tail sleeve fastener boss 21, thereby facilitating snap-fit assembly between the tail sleeve and the pull handle housing 1. After the reinforcing posts 17 are inserted into the plug holes 23, they can axially and radially restrict relative wobbling of the pull handle housing 1 and the MPO tail sleeve 2 in combination with the snap-fitting structure formed by the tail sleeve fastener boss 21 and the pull handle housing fastener recess 12.

Figure 6:
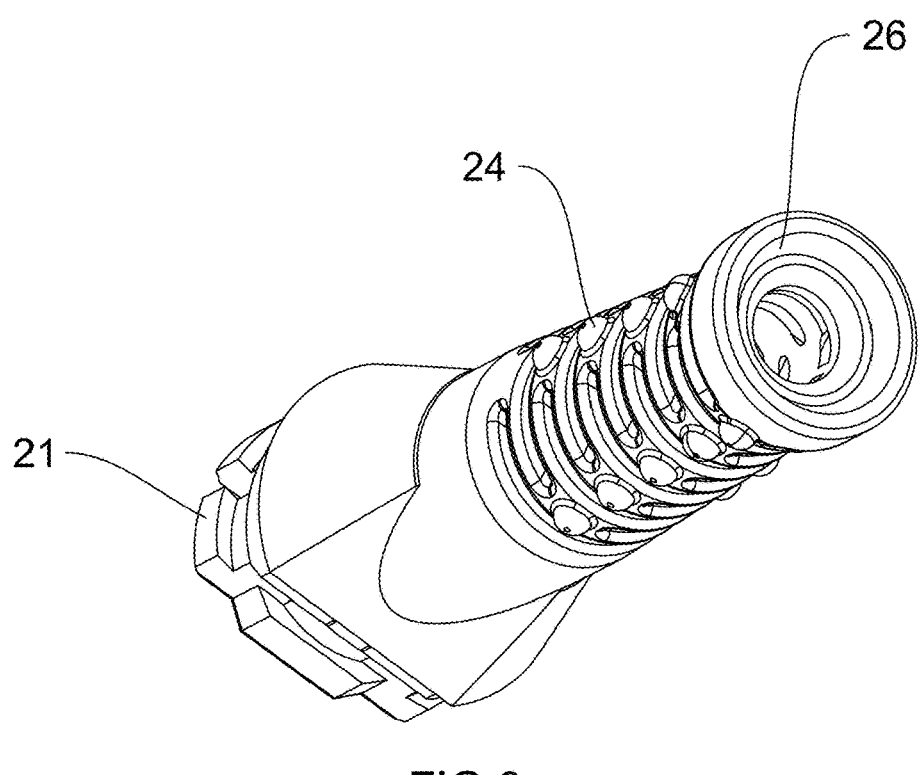
FIG. 6 is a schematic structural diagram of an MPO tail sleeve.

As shown in FIGS. 4 and 6, in a preferred embodiment, the outer periphery of the bottom of the MPO tail sleeve is provided with several boss dots 24, and the boss dots 24 are uniformly distributed in a circumferential direction of the bottom of the tail sleeve. The protruding height and spacing of the boss dots are optimally designed, such that a gripping friction force between the hand and the tail sleeve can be significantly increased by enhancing the roughness of the contact surface when the operator holds the tail sleeve, thereby avoiding unstable force application caused by hand slippage during plugging and unplugging operations. Especially when the hand is contaminated with oil stains or sweat, reliable holding can still be ensured.

As shown in FIG. 7, the outer periphery of the bottom of the MPO tail sleeve is provided with a plurality of gaps, and bending reinforcement ribs 25 are arranged in the gaps. The gaps provide a certain space for flexible deformation of the tail sleeve, allowing for angular adjustment when an optical cable 12 is bent. Moreover, the bending reinforcement ribs 25 arranged in the gaps enhance the structural toughness of the tail sleeve, thereby limiting excessive deformation to protect the internal optical cable 12.

As shown in FIG. 6, in a preferred embodiment, one end of a cable outlet hole of the MPO tail sleeve is provided with a dual-ring platform 26, the dual-ring platform 26 includes a first ring platform close to the outside and a second ring platform close to the inside, the outer diameter of the first ring platform is greater than the outer diameter of the second ring platform, and a transitional inclined surface is provided between the two ring platforms. In this structural design, a stepped change in outer diameter is formed via the dual-ring platform 26, and a smooth transition is achieved using the transitional inclined surface, such that stress concentration at a bending portion of the optical cable 12 can be effectively dispersed, and progressive support can be provided for the optical cable 12, thereby better protecting the bending portion of the optical cable 12, and achieving a more superior stress transition effect.

Figure 2:
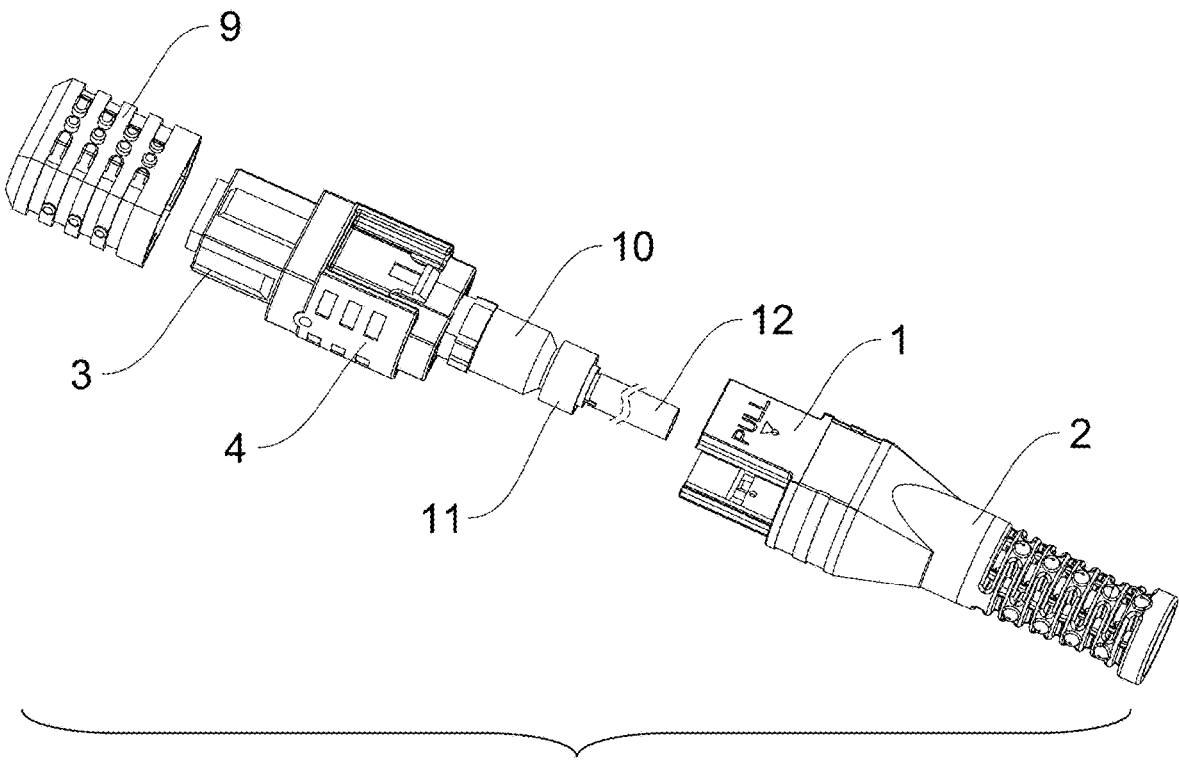
FIG. 2 is an exploded view of a structure of the present invention.

As shown in FIG. 2 and FIG. 3, in the present invention, the connector is further provided with a metal pressure ring 10 and a metal clamping ring 11 for fixing an optical cable 12. Specifically, the metal pressure ring 10 is sleeved around the outer periphery of the optical cable 12 between the MPO inner housing and the MPO tail sleeve 2, and a front end of the metal pressure ring 10 abuts against a rear end of the MPO inner housing to press an aramid layer of the optical cable 12; and the metal clamping ring 11 is sleeved around the outer periphery of the optical cable 12 on one side of the metal pressure ring 10 away from the MPO inner housing, and fine and dense serrated protrusions are distributed on an inner wall of the metal pressure ring 10. After fastening, the protrusions can penetrate into the aramid layer of the optical cable 12 to firmly press high-tensile-strength aramid fibers, thus effectively dispersing the axial pulling force during plugging and unplugging operations, and preventing slippage or breakage of the aramid layer. Moreover, a front end of the metal clamping ring 11 abuts against a rear end of the metal pressure ring 10 to press an outer sheath of the optical cable 12.

The technical features of the above embodiments may be combined arbitrarily. For the sake of brevity, all possible combinations of the technical features in the above embodiments are not described. However, the combinations of these technical features should be considered to be within the scope of this specification as long as there is no contradiction between them.

The above embodiments only express several implementations of the present invention and are described more specifically and detailedly, but cannot be construed as limitations to the scope of patent of the present invention. It should be pointed out that several modifications and improvements may also be made by those of ordinary skill in the art without departing from the conception of the present invention, and all fall within the scope of protection of the present invention. Therefore, the scope of patent protection of the present invention shall be subject to the appended claims.

What is claimed is:

1. A push-pull type multi-fiber push-on (MPO) connector, comprising a ferrule assembly, an MPO inner housing, an MPO outer housing, and an MPO stopper which constitute a connector body, and a pull handle housing and an MPO tail sleeve which constitute a connector sleeve housing, wherein the pull handle housing is detachably connected to the MPO tail sleeve, and the pull handle housing is connected to the MPO outer housing;

a fitting structure capable of sequentially transmitting a pulling force is disposed between adjacent two of the MPO tail sleeve, the pull handle housing, and the MPO outer housing, such that when the MPO tail sleeve is pulled, the MPO outer housing is driven to move to withdraw the ferrule assembly of the connector from a receptacle; and another fitting structure capable of sequentially transmitting a pushing force is disposed between adjacent two of the MPO tail sleeve, the pull handle housing, and the MPO stopper, such that when the MPO tail sleeve is pushed, the MPO stopper is driven to move to insert the ferrule assembly of the connector into the receptacle;

two opposite sidewalls of the MPO outer housing are each provided with axially extending sliding grooves, the pull handle housing is correspondingly provided with sliding rails, and the pull handle housing is snap-fitted into the MPO outer housing after the sliding grooves are slidably connected to the sliding rails and slide into place.

2. The push-pull type MPO connector according to claim 1, wherein in the fitting structure capable of sequentially transmitting the pulling force between adjacent two of the MPO tail sleeve, the pull handle housing, and the MPO outer housing, an outer sidewall of an end part of the MPO tail sleeve is provided with a tail sleeve fastener boss, and the pull handle housing is correspondingly provided with a pull handle housing fastener recess that fits with the tail sleeve fastener boss;

an outer sidewall of the MPO outer housing is provided with an outer housing fastener boss that is located between the two sliding grooves on a same side, and the pull handle housing is correspondingly provided with a pull handle housing fastener boss that fits with the outer housing fastener boss; and when the MPO tail sleeve is pulled, a fit surface between the tail sleeve fastener boss and the pull handle housing fastener recess, and a fit surface between the pull handle housing fastener boss and the outer housing fastener boss transmit the pulling force to drive the MPO outer housing to move.

3. The push-pull type MPO connector according to claim 2, wherein a position of a sidewall of the pull handle housing corresponding to the outer housing fastener boss is provided with a fastener release hole penetrating through the sidewall of the pull handle housing; and when the pull handle housing needs to be disassembled from the MPO outer housing, a tool is inserted into the fastener release hole and an acting force is applied toward the outer housing fastener boss, such that the outer housing fastener boss is elastically deformed and disengaged from the pull handle housing fastener boss, thereby releasing a pulling force transmission connection between the pull handle housing and the MPO outer housing.

4. The push-pull type MPO connector according to claim 1, wherein in said another fitting structure capable of sequentially transmitting the pushing force between adjacent two of the MPO tail sleeve, the pull handle housing, and the MPO stopper, a front end of the MPO tail sleeve is provided with a forward thrust surface extending radially inward, and a rear end surface of the pull handle housing is provided with a pull handle housing outer fitting surface corresponding to the forward thrust surface;

a rear end of the MPO stopper is provided with a forward force-bearing surface extending radially inward, and a front end surface of the pull handle housing is provided with a pull handle housing force application surface corresponding to the forward force-bearing surface; and when the MPO tail sleeve is pushed, the forward thrust surface abuts against the pull handle housing outer fitting surface to transmit the pushing force from the MPO tail sleeve to the pull handle housing, and the pull handle housing force application surface abuts against the forward force-bearing surface to transmit the pushing force from the pull handle housing to the MPO stopper, thereby driving the MPO stopper to move.

5. The push-pull type MPO connector according to claim 1, wherein two opposite outer sidewalls of the MPO inner housing are provided with spring grooves, and side springs are mounted in the spring grooves;

other two opposite outer sidewalls of the MPO inner housing are provided with inner housing fasteners, inner sidewalls of the MPO outer housing are correspondingly provided with outer housing fasteners, the MPO outer housing is sleeved outside the bottom of the MPO inner housing, and the MPO outer housing is snap-fitted into the MPO inner housing via the inner housing fasteners and the outer housing fasteners; and the ferrule assembly is inserted into the top of the MPO inner housing, the MPO stopper is inserted from the bottom of the MPO inner housing, two opposite outer sidewalls of the MPO stopper are provided with side fasteners, the MPO inner housing is correspondingly provided with side fastener holes, and the side fasteners are snap-fitted into the side fastener holes.

6. The push-pull type MPO connector according to claim 5, wherein a tail end of the ferrule assembly is sleeved with an MPO female socket, a central spring is disposed between the MPO female socket and the MPO stopper, one end of the central spring abuts against the MPO female socket, and the other end of the central spring abuts against the MPO stopper.

7. The push-pull type MPO connector according to claim 1, wherein two opposite sides of the bottom of the pull handle housing are provided with reinforcing posts; corresponding sides of a port of the MPO tail sleeve are provided with notch grooves, the notch grooves are configured to avoid the reinforcing posts and to enhance the elasticity of the port of the MPO tail sleeve, and groove bottoms of the notch grooves are provided with plug holes; and when the pull handle housing is connected to the MPO tail sleeve, the reinforcing posts are inserted into the plug holes.

8. The push-pull type MPO connector according to claim 1, wherein the outer periphery of the bottom of the MPO tail sleeve is provided with several boss dots, and the boss dots are configured to increase a gripping friction force; and the outer periphery of the bottom of the MPO tail sleeve is provided with a plurality of gaps, and bending reinforcement ribs are arranged in the gaps and configured to increase the bending stiffness of the tail sleeve.

9. The push-pull type MPO connector according to claim 1, wherein one end of a cable outlet hole of the MPO tail sleeve is provided with a dual-ring platform, the dual-ring platform comprises a first ring platform close to the outside and a second ring platform close to the inside, the outer diameter of the first ring platform is greater than the outer diameter of the second ring platform, and a transitional inclined surface is provided between the two ring platforms.

* * * * *